United States Patent
Bleichenbacher

(10) Patent No.: US 7,593,526 B2
(45) Date of Patent: Sep. 22, 2009

(54) METHOD AND APPARATUS FOR COMPRESSING RABIN SIGNATURES

(75) Inventor: Daniel Bleichenbacher, Summit, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1127 days.

(21) Appl. No.: 10/763,601

(22) Filed: Jan. 23, 2004

(65) Prior Publication Data

US 2005/0163314 A1 Jul. 28, 2005

(51) Int. Cl.
*H04L 9/00* (2006.01)
*H04L 9/30* (2006.01)
*G06F 11/30* (2006.01)

(52) U.S. Cl. .................. 380/30; 380/46; 713/176; 713/189; 713/190; 713/191; 713/192

(58) Field of Classification Search ............ 380/30
See application file for complete search history.

(56) References Cited

U.S. PATENT DOCUMENTS 6,141,421 A * 10/2000 Takaragi et al. ............ 380/30

FOREIGN PATENT DOCUMENTS

WO WO 03/021864 A2 3/2003

OTHER PUBLICATIONS

Coppersmith, D., "Finding a Small Root of Univariate Modular Equation," U. Maurer (Ed.): Advances in Cryptology—EUROCRYPT '96, LNCS 1070, pp. 155-165 (1996.

* cited by examiner

*Primary Examiner*—Longbit Chai

(57) ABSTRACT

A method and apparatus are disclosed for compressing Rabin signatures. The disclosed compression scheme compresses a Rabin signature, s, for a user having a public key, n, based on a continued fraction expansion of s/n. The continued fraction expansion of s/n can be performed by (i) computing principal convergents, $u_i/v_i$, for i equal to 1 to k, of a continued fraction expansion of s/n, where k is a largest integer for which principal convergents are defined; establishing an index l, such that $v_l < \sqrt{n} \leq v_{l+1}$; and generating a compressed Rabin signature ($v_l$, m) for a message, m.

12 Claims, 2 Drawing Sheets

METHOD AND APPARATUS FOR COMPRESSING RABIN SIGNATURES

FIELD OF THE INVENTION

The present invention relates to Rabin signature schemes and, more particularly, to a method and apparatus for compressing Rabin signatures.

BACKGROUND OF THE INVENTION

Digital signatures are often employed to ensure the authenticity of transmitted information. A message generator generates a digital signature, s, using a public-key method, such as RSA public key cryptography techniques or the Rabin signature scheme. The message generator sends a message, m, and the signature, s, to a receiver. A Rabin signature, s, typically has a length on the order of 1024 bits. Thus, the Rabin signature scheme adds a significant overhead to a transmitted message. A number of techniques have thus been proposed or suggested for compressing Rabin signatures. Generally, the compression techniques aim to send only a portion of the Rabin signature, such that the transmitted portion is sufficient to reconstruct the full signature.

For example, Coron and Naccache have shown that a Rabin signature can be reconstructed if, for example, more than half of the most significant bits of s are known. See, International Published Patent Application No. WO 03/021864 A2, "Method and Apparatus of Reducing the Size of an RSA or Rabin Signature," to Jean Sebastien Coron and David Nacacche, Published Mar. 13, 2003. Generally, Coron and Naccache use Coppersmith's LLL-based root finding method, as described in Don Coppersmith, "Finding a Small Root of a Univariate Modular Equation," Advances in Cryptology, EUROCRYPT '96, Vol. 1070 of Lecture Notes in Computer Science, 155-165 (1996; Springer Verlag). The Coppersmith LLL-based root finding method leads to a slow decompression when the fraction of known bits is close to fifty percent (50%).

It has been suggested that a fast decompression method can be found when at least ⅔ of the bits are given. As used herein, a "fast compression method" means significantly faster than generating a signature (e.g., faster than 1 millisecond on a 1 MHz computer) and a "slow decompression method" means significantly slower than generating a signature (e.g., longer than 1 second on a 1 MHz computer). A need therefore exists for a fast compression method that can compress a Rabin signature by fifty percent.

SUMMARY OF THE INVENTION

Generally, a method and apparatus are disclosed for compressing Rabin signatures. The disclosed compression scheme compresses a Rabin signature, s, for a user having a public key, n, based on a continued fraction expansion of s/n. In one implementation, the continued fraction expansion of s/n is performed by (i) computing principal convergents, $u_i/v_i$, for i equal to 1 to k, of a continued fraction expansion of s/n, where k is a largest integer for which principal convergents are defined; establishing an index l, such that $v_l < \sqrt{n} \leq v_{l+1}$; and generating a compressed Rabin signature $(v_l, m)$ for a message, m.

A more complete understanding of the present invention, as well as further features and advantages of the present invention, will be obtained by reference to the following detailed description and drawings.

DETAILED DESCRIPTION

Figure 1:
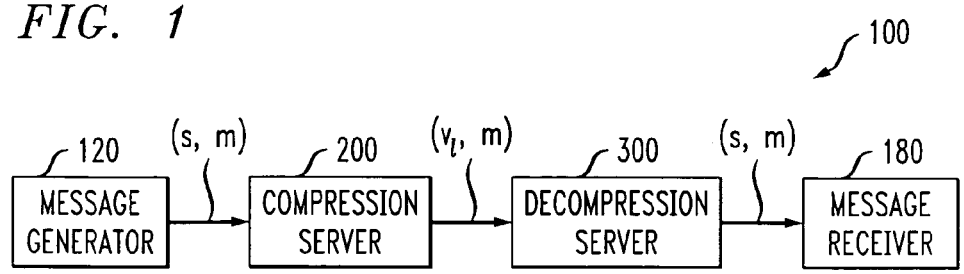
FIG. 1 illustrates a network environment in which the present invention can operate.

FIG. 1 illustrates a network environment 100 in which the present invention can operate. As shown in FIG. 1, a message generator 120 provides a message, m, and digital signature, s, to a compression server 200, discussed further below in conjunction with FIG. 2. The compression server 200 in turn compresses the signature, s, and transmits the message, together with the compressed Rabin signature $(v_l, m)$ to a decompression server 300, discussed further below in conjunction with FIG. 3. The decompression server 300 decompresses the message and compressed Rabin signature $(v_l, m)$ and provides the message and signature (s, m) to a message receiver 180. Thus, the decompression server 300 receives the message m, and a portion $v_l$ of the signature and must solve for the unknown portion of the signature.

Figure 2:
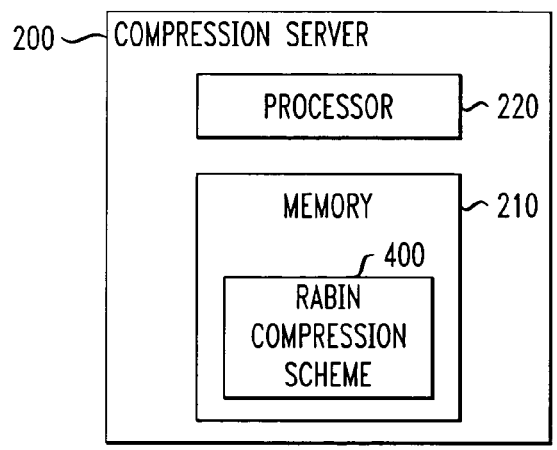
FIG. 2 is a schematic block diagram of the compression server of FIG. 1.

FIG. 2 is a schematic block diagram of the compression server 200 of FIG. 1. As shown in FIG. 2, the compression server 200 includes a memory 210 and a processor 220. Memory 210 will configure the processor 220 to implement the methods, steps, and functions disclosed herein. The memory 210 could be distributed or local and the processor 220 could be distributed or singular. The memory 210 could be implemented as an electrical, magnetic or optical memory, or any combination of these or other types of storage devices. The term "memory" should be construed broadly enough to encompass any information able to be read from or written to an address in the addressable space accessed by processor 220. With this definition, information on a network is still within memory 210 because the processor 220 can retrieve the information from the network. As shown in FIG. 2, the memory 210 includes a Rabin compression scheme 400, discussed further below in conjunction with FIG. 4, that compresses Rabin signatures according to the present invention.

Figure 3:
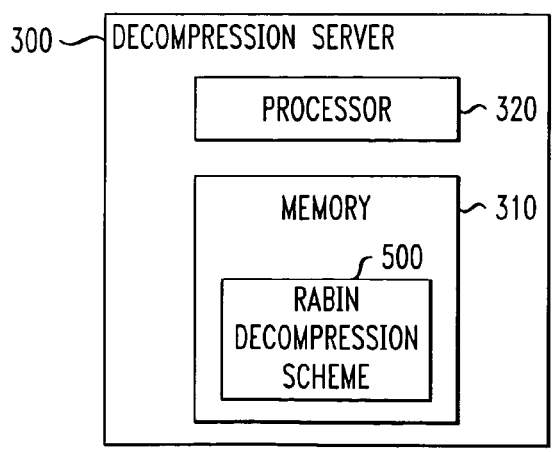
FIG. 3 is a schematic block diagram of the decompression server of FIG. 1.

FIG. 3 is a schematic block diagram of the decompression server 300 of FIG. 1. As shown in FIG. 3, the decompression server 300 includes a memory 310 and a processor 320 that operate in the same manner as FIG. 2. The memory 310 includes a Rabin decompression scheme 500, discussed further below in conjunction with FIG. 5, that decompresses Rabin signatures that were compressed according to the present invention.

Rabin Signatures

Using the Rabin scheme, the message generator randomly selects two prime numbers, p and q, as the private key of the message generator. The public key is the value n, equal to the product of p and q (n=p*q). For a detailed discussion of the Rabin scheme, see, for example, Michael O. Rabin, "Digitalized Signatures," Foundation of Secure Computation, 155-69 (1978), incorporated by reference herein.

In order to apply a signature to a message, m, the message generator calculates the signature, s, as follows:

$$s^2 \equiv h(m) \pmod{n},$$

where h is a message formatting function. The above computation is often expressed as follows:

$$s = h(m)^{1/2} \bmod (p*q).$$

The message generator sends the message, m, and the signature, s, to a receiver. The receiver can verify the signature based on the following expression:

$$h(m) = s^2 \bmod n.$$

In other words, the receiver of a Rabin signature can verify the signature by (i) squaring the signature, s, (ii) reducing the result modulo the message generator's public key, n, and (iii) comparing the result with the message digest of the message to be signed. The receiver accepts the message if the two values are equal.

Compression of Rabin Signatures

As previously indicated, compression techniques aim to send only a portion of the Rabin signature, such that the transmitted portion is sufficient to reconstruct the full signature. The compression scheme of the present invention computes a continued fraction expansion, discussed below, of the real number s/n. A signature is reconstructed given the largest integer that is a numerator of a principal convergent of s/n and that is smaller than the square root of n ($\sqrt{n}$).

Thus, the compression scheme of the present invention replaces the signature, s, by a positive integer v smaller than $\sqrt{n}$, such that v, n and m are sufficient to recover the signature s, without knowledge of the secret key. It is assumed that the message formatting function, h, is deterministic. In other words, the value h(m) can be computed without knowledge of the signature, s. For example, the signature scheme described in PKCS #1 Version 1.5 RSA Encryption Standard from RSA Data Security, Inc. of Redwood City, Calif., uses a deterministic formatting.

Continued Fractions

As previously indicated, the present invention computes a continued fraction expansion of the real number s/n. Let a be a real positive number. Define $\alpha_0 = \alpha$, $q_i = \lfloor \alpha_i \rfloor$ and define recursively $\alpha_{i+1} = 1/\{\alpha_i\}$ for all $i \geq 0$ until $\{\alpha_i\} = 0$, where "$\lfloor \ \rfloor$" indicates rounding down to the next integer and "$\{\ \}$" indicates the fractional part of a number. Then, the partial convergents $u_i = v_i$ of s can be computed by $u_0 = q_0$; $v_0 = 1$; $u_1 = q_0 q_1$; $v_1 = q_1 + 1$ and $u_{i+2} = q_{i+2} u_{i+1} + u_i$; $v_{i+2} = q_{i+2} v_{i+1} + v_i$. The theory of continued fractions asserts that the principal convergents $u_i = v_i$ are close rational approximations of $\alpha$. In particular, the following equation is satisfied:

$$|v_i \alpha - u_i| \leq 1/v_{i+1} \quad (1)$$

See, e.g., Donald E. Knuth, The Art of Computer Programming, Seminumerical Algorithms, Vol. 2, §4.5.3, Eq. (12), Addison Wesley (2nd edition, 1981); or Serge Lang, "Introduction to Diophantine Approximations," Ch. 1, Theorem 5, Springer Verlag, (1995). If $\alpha$ is rational, then there exists an integer k with $\{\alpha_k\} = 0$ and $u_k/v_k = \alpha$.

Compression

Figure 4:
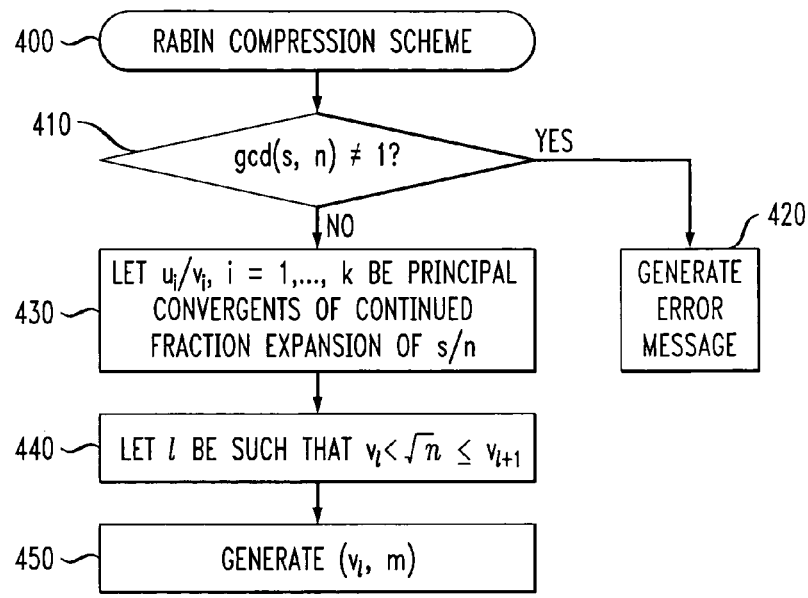
FIG. 4 is a flow chart describing an exemplary implementation of a Rabin compression scheme incorporating features of the present invention.

FIG. 4 is a flow chart describing an exemplary implementation of a Rabin compression scheme 400 incorporating features of the present invention. As shown in FIG. 4, the Rabin compression scheme 400 compresses a signature (s; m) as follows: If it is determined during step 410 that gcd(s, n)≠1 (where "gcd" indicates the greatest common denominator), then output an error during step 420 and stop. Otherwise, during step 430 let $u_i/v_i$, $i=1, \ldots, k$ be the principal convergents of the continued fraction expansion of s/n. During step 440, let l be such that $v_l < \sqrt{n} \leq v_{l+1}$. Then, the compressed Rabin signature is ($v_l$, m), where k is the largest integer for which principal convergents are defined.

Verification and Decompression

Figure 5:
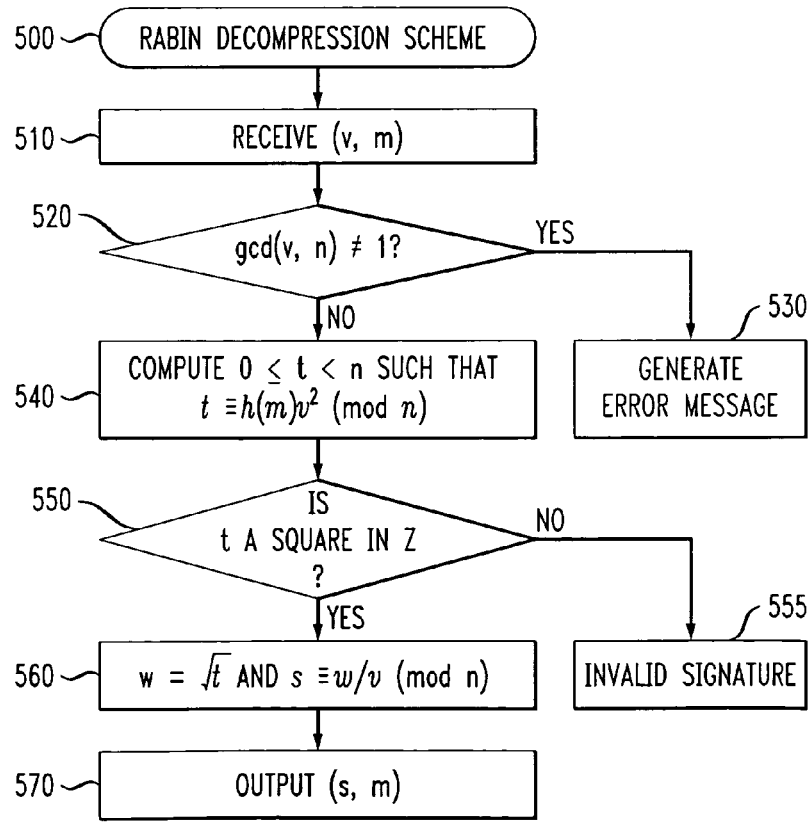
FIG. 5 is a flow chart describing an exemplary implementation of a Rabin decompression scheme incorporating features of the present invention.

FIG. 5 is a flow chart describing an exemplary implementation of a Rabin decompression scheme 500 incorporating features of the present invention. As shown in FIG. 5, the Rabin decompression scheme 500 initially receives (v, m), a compressed signature, during step 510. If it is determined during step 520 that gcd(v, n)≠1, then output an error during step 530 and stop. Otherwise, during step 540, compute $0 \leq t < n$ such that:

$$t \equiv h(m) v^2 \pmod{n}.$$

The compressed signature is valid if and only if t is a square in Z. If the compressed signature is determined to be valid during step 550, then set $w = \sqrt{t}$ and $s = w/v \pmod n$ during step 560 and output (s, m) during step 570.

Analysis

Thus, the Rabin compression scheme 400 and Rabin decompression scheme 500 of the present invention do not need to use the secret key. The following theorem shows that any valid Rabin signature can be converted into a valid compressed signature and vice versa. Thus, Rabin signatures and compressed signatures are equally difficult to forge.

Theorem 1. Let n be a Rabin public key that is square free.
(I) If (s, m) is a valid Rabin signature, then the compression algorithm 400 generates a valid compressed signature for m or finds a nontrivial factor of n.
(II) If (v, m) is a valid compressed signature, then the decompression algorithm 500 generates a valid Rabin signature for m.

Time Complexity

The Rabin compression scheme 400 requires a continued fraction expansion and takes time $O(\log(n)^2)$. The Rabin decompression scheme 500 requires two multiplications and an inverse over Z/nZ and a square root in Z and hence also takes time $O(\log(n)^2)$. It is noted that these bounds are obtained by using known methods. Asymptotically faster algorithms (e.g., FFT based gcd) are not optimal for typical key sizes.

Variant

An alternative compressed signature is (|r|, m), where $r \in Z$ is such that $|r| \leq \sqrt{n}$ and $r \equiv v_l s \pmod n$. It can be shown that such an r exists when $v_l < \sqrt{n} < v_{l+1}$. A compressed signature is valid if $h(m)/r^2 \bmod n$ is a square in Z. Decompression is done using the equality $(v_l)^2 \equiv h(m)/r^2 \pmod n$. This variant is more expensive, because the verifier has to compute an additional modular inverse, but the variant has the advantage that the verification accepts both compressed and uncompressed signatures without modification.

Extension to RSA Signatures

The present invention can be extended to RSA signatures with small public exponent (i.e., e=3), but the benefits are smaller. For e equal to 3, the signature can be compressed to ⅔ of its size as follows.

Assume that:

$$s^3 \equiv h(m) \pmod{n},$$

is an RSA signature, where h is again a deterministic formatting function. To compress a signature, one computes the continued fraction expansion of s/n and selects the principal convergent $u_l/v_l$ satisfying $v_l < n^{2/3} \leq v_{l+1}$. The compressed RSA signature is $(v_l, m)$.

Equation (1) implies $$|v_l s - u_l n| \leq n^{1/3},$$

and thus there exists $r \in Z$ with $|r| \leq n^{1/3}$ and $r^3 \equiv h(m)(v_l)^3 \pmod{n}$.

Given $h(m)$ and $v_l$, this value r can be found by checking whether either of $h(m)(v_l)^3 \mod n$ or $n - h(m)(v_l)^3 \mod n$ is a cube in Z. Finally, one can reconstruct the signature by setting $s \equiv r/v_l \pmod{n}$.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks such as DVD, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer readable code means is any mechanism for allowing a computer to read instructions and data, such as magnetic variations on a magnetic media or height variations on the surface of a compact disk, such as a DVD.

It is to be understood that the embodiments and variations shown and described herein are merely illustrative of the principles of this invention and that various modifications may be implemented by those skilled in the art without departing from the scope and spirit of the invention.

I claim:

1. A method for compressing a Rabin signature, s, for a user having a public key, n, comprising:
    configuring a processor to perform the steps of;
    compressing said Rabin signature using a continued fraction expansion of s/n, wherein said continued fraction expansion of s/n further comprises the steps of;
    computing principal convergents, $u_i/v_i$, for i equal to 1 to k, of a continued fraction expansion of s/n, where k is a largest integer for which principal convergents are defined, where $U_i$ and $v_i$ are principal convergents, and where a greatest common denominator $(s, n) \neq 1$;
    establishing an index l, such that $v_l < \sqrt{n} < v_{l+1}$; and generating a compressed Rabin signature $(v_l, m)$ for a message, m, using said continued fraction expansion of s/n.

2. The method according to claim 1, wherein $sv \equiv u \pmod{n}$.

3. The method according to claim 1, wherein $|v| \leq \sqrt{n}$.

4. The method according to claim 1, wherein $|u| \leq \sqrt{n}$.

5. A method for decompressing a compressed Rabin signature $(v, m)$ for a message, m, and user having a public key, n, comprising:
    configuring a processor to perform the steps of:
    applying a message formatting function, h, to the message, m, to computing h(m);
    computing a value, t, as $h(m)v^2 \mod n$;
    obtaining a value, w, as a square root of the value, t;
    computing a signature value, s, as $w/v \mod n$; and
    providing a decompressed signature (s,m).

6. The method of claim 5, further comprising the step of generating an error if no integer square root exists.

7. A method for compressing an RSA signature, s, for a message, m, and a user having a public key (n, e), comprising:
    configuring a processor to perform the steps of:
    computing principal convergents, $u_{i/vi}$, of for i equal to 1 to k, a continued fraction expansion of s/n, where k is a largest integer for which principal convergents are defined, where $u_i$ and $v_i$ are principal convergents, and where a greatest common denominator $(s, n) \neq 1$;
    establishing an index l, such that $v_l < n^{(1-1/e)} \leq v_{l+1}$; and
    generating a compressed RSA signature $(v_l, m)$ using said continued fraction expansion of s/n.

8. A method for decompressing a RSA signature $(v, m)$ for a message, m, and a user having a public key (n, e), comprising:
    configuring a processor to perform the steps of:
    applying a message formatting function, h, to the message, m, to computing h(m);
    computing a value, t, as $h(m)v^e \mod n$;
    determining whether the values t or t-n have an $e^{th}$ root over integer values;
    computing a value, w, as the $e^{th}$ root; and computing the decompressed signature $(w/v \mod n, m)$.

9. The method of claim 8, further comprising the step of generating an error if no $e^{th}$ root exists.

10. A system for compressing a Rabin signature, s, for a user having a public key, n, comprising:
    a memory; and
    at least one processor, coupled to the memory, operative to:
    compress said Rabin signature using a continued fraction expansion of s/n, wherein said processpr is further configured to perform said continued fraction expansion of s/n by:
    computing principal convergents, $u_{i/vi}$, for i equal to 1 to k, of a continued fraction expansion of s/n, where k is a largest integer for which principal convergents are defined, where $U_i$ and $v_i$ are principal convergents, and where a greatest common denominator $(s, n) \neq 1$;
    establishing an index l, such that $v_l < \sqrt{n} \leq v_{l+1}$; and
    generating a compressed Rabin signature $(v_l, m)$ for a message, m, using said continued fraction expansion of s/n.

11. A system for decompressing a compressed Rabin signature $(v, m)$ for a message, m, and user having a public key, n, comprising:
    a memory; and
    at least one processor, coupled to the memory, operative to:
    apply a message formatting function, h, to the message, m, to computing h(m);
    compute a value, t, as $h(m)v \mod n$;
    obtain a value, w, as a square root of the value, t;
    compute a signature value, s, as $w/v \mod n$; and
    providing a decompressed signature (s,m).

12. The system of claim 11, wherein said processor is further configured to generate an error if no integer square root exists.

* * * * *

UNITED STATES PATENT AND TRADEMARK OFFICE
CERTIFICATE OF CORRECTION

PATENT NO.      : 7,593,526 B2                             Page 1 of 1
APPLICATION NO. : 10/763601
DATED           : September 22, 2009
INVENTOR(S)     : Daniel Bleichenbacher It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1625 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,593,526 B2  Page 1 of 1
APPLICATION NO. : 10/763601
DATED : September 22, 2009
INVENTOR(S) : Daniel Bleichenbacher It is certified that error appears in the above-identified patent and that said Letters Patent is hereby corrected as shown below:

In claim 1, column 5, line 44, ";" should be replaced by -- : --.

In claim 1, column 5, line 48, "U" should be replaced by -- u --.

In claim 7, column 6, line 9, "$u_{i/vi}$" should be replaced by -- $u_i/v_i$ --.

In claim 10, column 6, line 41, "U" should be replaced by -- u --.

In claim 10, column 6, line 43, "$\leq$" should be replaced by -- < --.

Signed and Sealed this
Twenty-second Day of January, 2013

David J. Kappos
*Director of the United States Patent and Trademark Office*